United States Patent [19]

Snell

[11] Patent Number: 5,265,492
[45] Date of Patent: Nov. 30, 1993

[54] HANDLE-OPERATED LOCKING DEVICE FOR TILT STEERING COLUMN

[75] Inventor: William M. Snell, Grand Blanc, Mich.

[73] Assignee: Chrysler Corporation, Highland Park, Mich.

[21] Appl. No.: 991,058

[22] Filed: Dec. 15, 1992

[51] Int. Cl.⁵ .............................................. B62D 1/18
[52] U.S. Cl. ........................................ 74/493; 74/523; 74/531; 74/537; 280/775
[58] Field of Search ................ 74/493, 523, 526, 527, 74/538, 531, 537, 538; 280/775

[56] References Cited

U.S. PATENT DOCUMENTS

| | | |
|---|---|---|
| 3,977,692 | 8/1976 | Findley et al. .................. 74/493 X |
| 4,244,237 | 1/1981 | Sprunger ................................ 74/493 |
| 4,541,298 | 9/1985 | Strutt ....................................... 74/493 |
| 4,788,880 | 12/1988 | Kester ..................................... 74/493 |
| 5,117,707 | 6/1992 | Kinoshita et al. ..................... 74/493 |

Primary Examiner—Leslie A. Braun
Assistant Examiner—David W. Laub
Attorney, Agent, or Firm—Edward A. Craig

[57] ABSTRACT

A device for locking a tilt steering column in adjusted position has two clamping rings, one of which is rotated by a handle. When the handle is rotated in one direction, the clamping rings interact to lock the steering column in adjusted position. When the handle is rotated in the opposite direction, the clamping rings release the steering column so that its position can be adjusted. The handle is normally positively retained in a position in which the locking device clamps the steering column, but can be moved to a position in which it unclamps the steering column upon operation of a release lever on the handle.

15 Claims, 4 Drawing Sheets

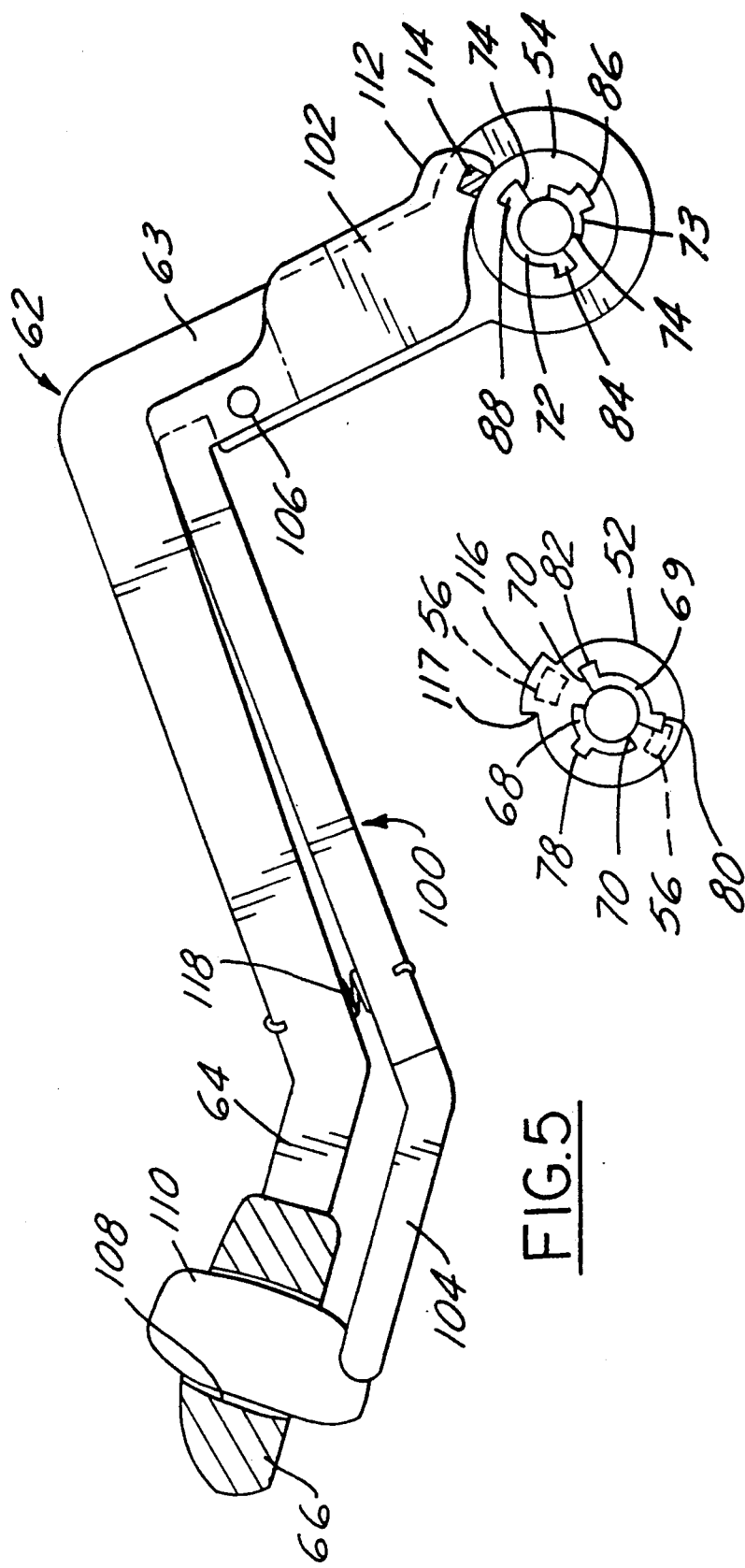

HANDLE-OPERATED LOCKING DEVICE FOR TILT STEERING COLUMN

This invention relates generally to tilt steering columns for automotive vehicles and refers more particularly to a handle-operated locking device for clamping the steering column in adjusted position. The handle is normally retained in a position in which the locking device clamps the steering column, but can be moved to a position in which the locking device unclamps the steering column upon operation of a release on the handle.

BACKGROUND AND SUMMARY OF THE INVENTION

Various mechanisms have been developed for locking tilt steering columns in adjusted position. Some have detents engageable with notches or teeth to lock the steering column in a number of separate discrete positions. Others have a worm gear/worm wheel arrangement for effecting fine adjustment.

The tilt-lock mechanism of this invention dispenses with detents, gears, worms and the like and provides an improved arrangement for clamping the steering column in any desired position and for releasing the steering column so that its position may be adjusted.

More specifically, the tilt device of this invention moves with the steering column. The tilt device preferably comprises two clamping rings, one of which can be rotated by a handle. When the handle is rotated in one direction, the clamping rings interact to clamp the steering column in adjusted position. When the handle is rotated in the opposite direction, the clamping rings release the column and permit it to be tilted to a different position where it again can be clamped by manipulation of the handle.

Releasable means, preferably in the form of a lug and a recess for receiving the lug, are provided to positively retain the handle in a position in which the clamping rings clamp the steering column. In the embodiment to be described, the lug is mounted on one end of a lever pivoted to the handle, and a spring urges the lever to pivot in a direction causing the lug to engage in the recess which is formed in one of the rings. The lever can be pivoted in the opposite direction against the force of the spring to withdraw the lug and permit the handle to be turned to release the clamping rings.

It is an object of the invention to provide a handle-operated device for releasably clamping a steering column in adjusted position having the above features.

It is a further object to provide a handle-operated locking device for a steering column which is composed of a relatively few simple parts, is rugged and durable, and is capable of being readily manufactured, assembled and operated.

Other objects, features and advantages of the invention will become more apparent as the following description proceeds, especially when considered with the accompanying drawings.

BRIEF DESCRIPTION OF THE DRAWINGS

FIG. 5 is a view partially in section taken on the line 5—5 in FIG. 3.

FIG. 6 a view taken on the line 6—6 in FIG. 3.

DETAILED DESCRIPTION

Figure 1:
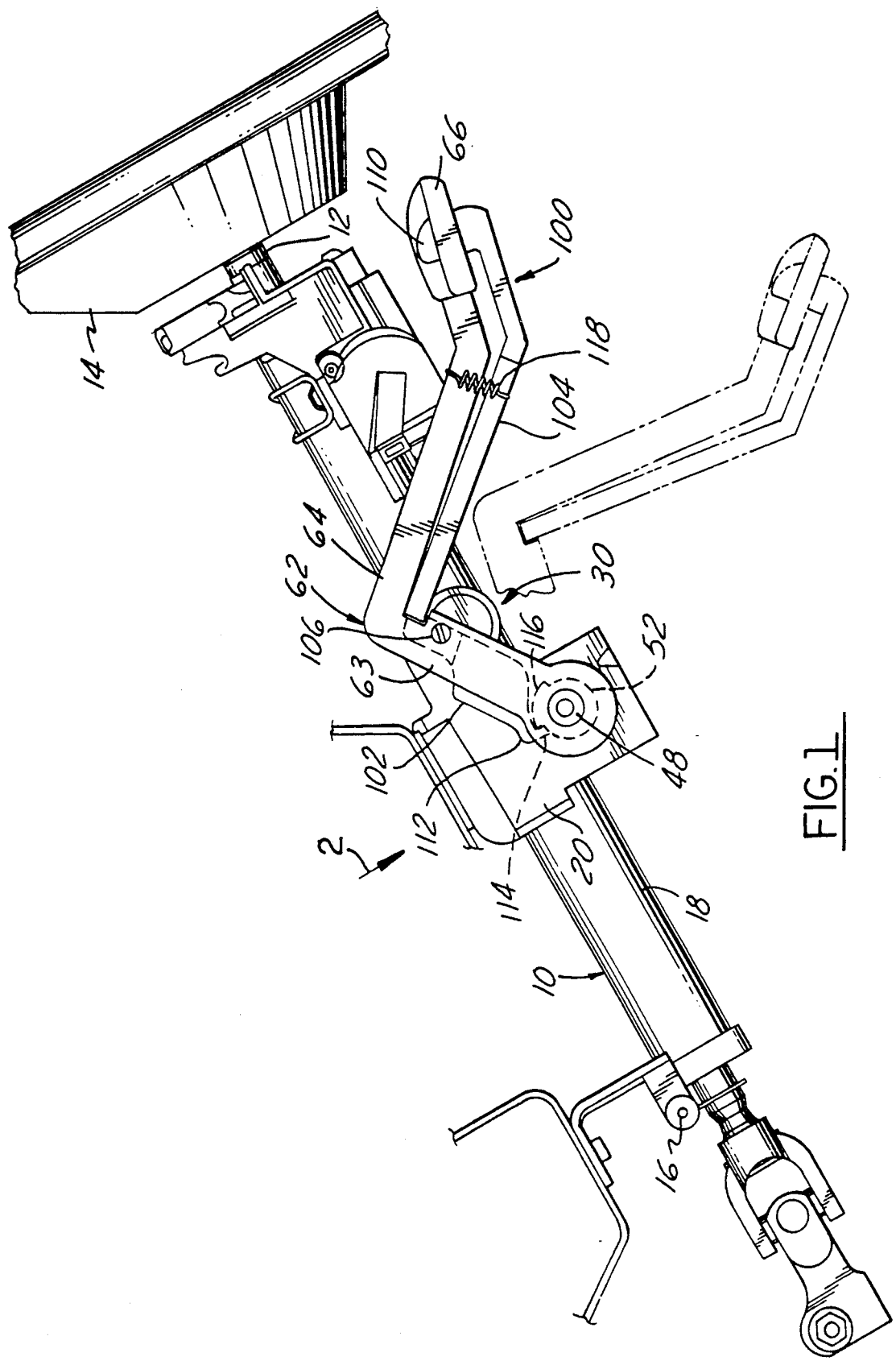
FIG. 1 is a side elevational view of a steering column of an automotive vehicle having a handle-operated device for releasably clamping the steering column in adjusted position, constructed in accordance with the invention.
Figure 2:
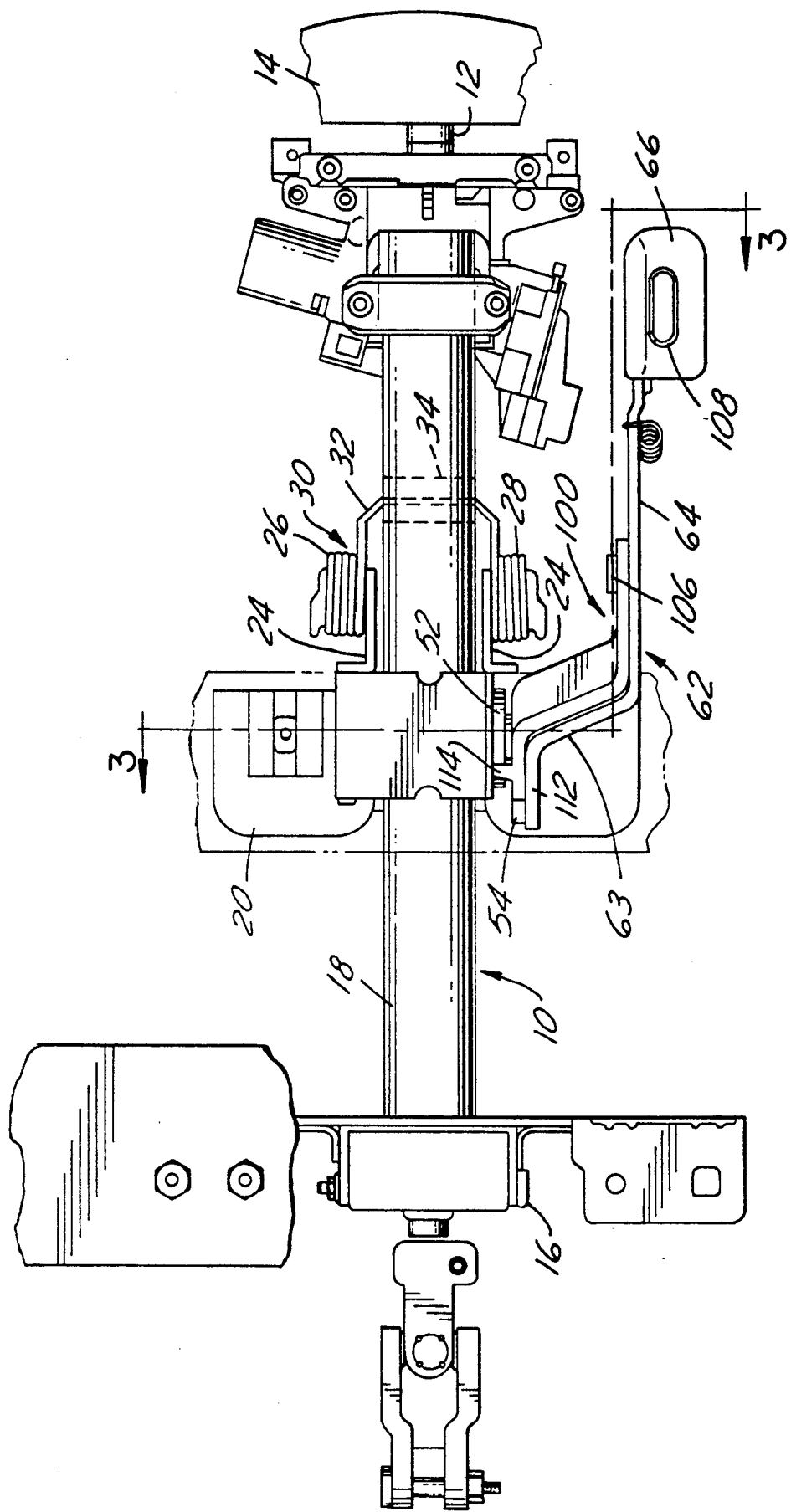
FIG. 2 is a view looking in the direction of the arrow 2 in FIG. 1.
Figure 3:
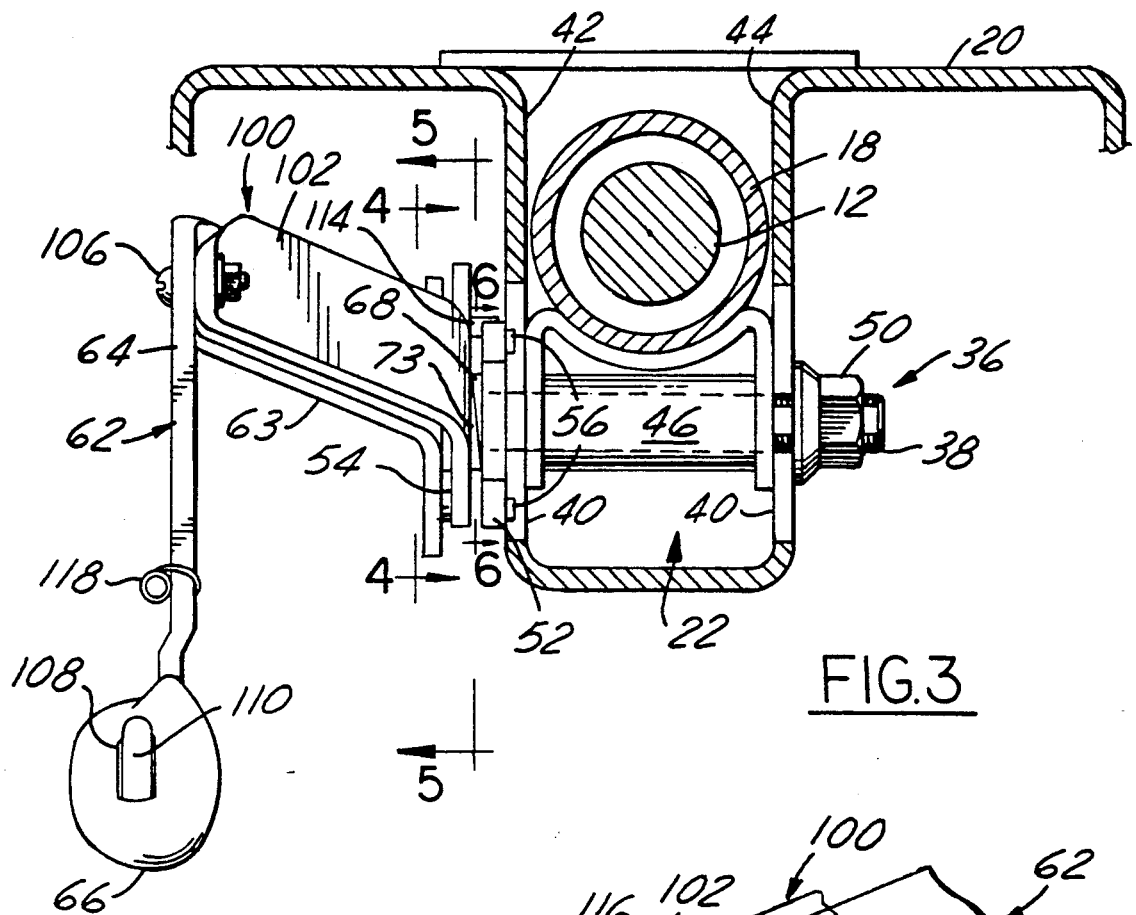
FIG. 3 is a sectional view taken on the line 3—3 in FIG. 2.
Figure 4:
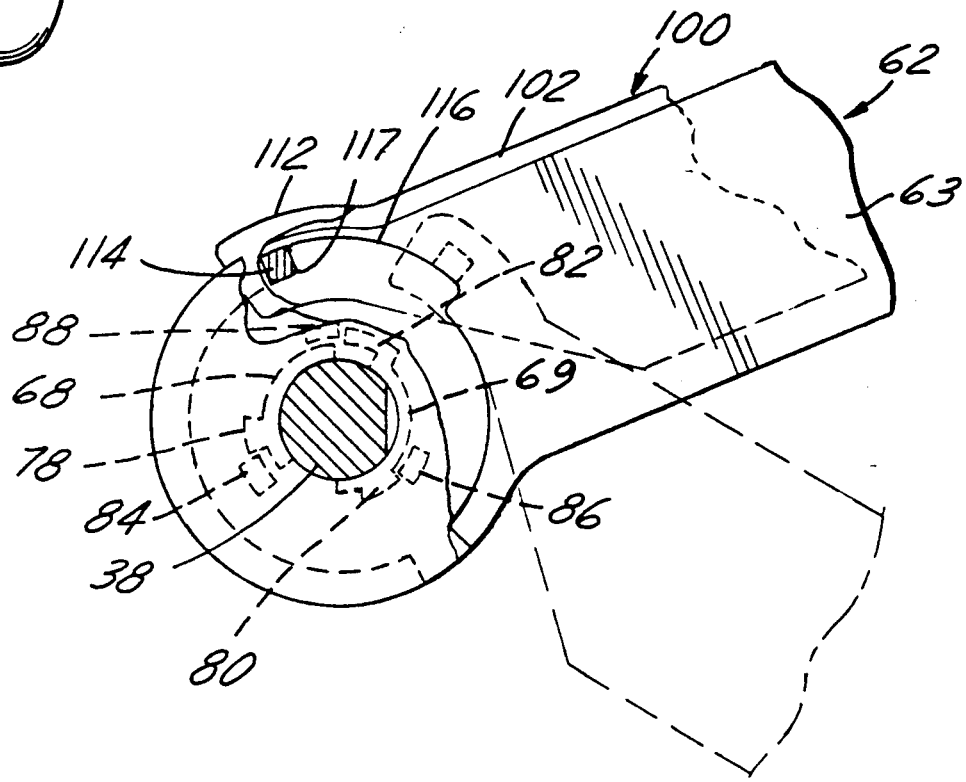
FIG. 4 is a sectional view taken on the line 4—4 in FIG. 3.

Referring now more particularly to the drawings, the steering column 10 comprises a steering shaft 12 one end of which is secured to the steering wheel 14. The other end is connected to the steering mechanism (not shown) and pivots about point 16. The steering shaft is supported for rotation in an elongated tubular housing 18.

The steering column 10 passes through a channel-shaped bracket 20 which is fixed in relation to the vehicle and is capable of pivoting up and down within the channel 22 of the bracket about pivot 16. The bracket has laterally spaced flanges 24 on which are mounted the coils 26 and 28 of a double torsion spring 30. The coils 26 and 28 are portions of a single continuous length of flexible, resilient spring wire material connected by an integral wire element 32 which extends across the steering column and bears in pressure contact with a spring engagement member 34 carried by the tubular housing. The wire element 32 imposes a constant spring pressure against the steering column 10 urging it in an upward direction in FIG. 1.

The steering column may be locked in adjusted position by a locking device 36. The locking device includes a pin 38 that extends across the channel 22. The pin extends through aligned, elongated arcuate slots 40 in the side walls 42 and 44 of the channel and also through holes in a stamping 46 rigidly secured to the steering column 10 so that the pin moves up and down with the steering column when the steering column is adjusted. The pin has a head 48 on the outer side of channel side wall 42 and a nut 50 is threaded on the end of the pin on the outer side of side wall 44.

Clamping rings 52 and 54 in the form of flat discs are sleeved on the pin 38 between head 48 and the outer side of the channel side wall 42. The clamping ring 52 is free to slide longitudinally on the pin, but has projections 56 on one side which engage in the slot 40 of channel side wall 42 to prevent clamping ring 52 from rotating. The clamping ring 54 is free to rotate and slide longitudinally on the pin 38 and is rotated by a radially outwardly extending handle 62. The handle 62 has integral arms 63 and 64 at right angles to one another. The arm 63 has an end portion secured as by welding to ring 54. Arm 63 is bent laterally outwardly so that arm 64 is spaced away from the steering column for convenient manipulation. A hand actuator pad 66 is on the free end of arm 64.

The clamping ring 52 has two angularly spaced, arcuate cams 68 and 69 on the inner side facing clamping ring 54, the axially inner surfaces of which slope away from the disc circumferentially toward the high end 70. The clamping ring 54 has two angularly spaced, arcuate cams 72 and 73 on the inner side facing clamping 52, the axially inner surfaces of which slope away from the disc circumferentially toward the high end 74. The cams on the two clamping rings are concentric and inter-engage with one another.

Clamping ring 52 has angularly spaced stops 78, 80 and 82 on the surface facing ring 54 which are angularly spaced apart equal distances. Clamping ring 54 has angularly spaced stops 84, 86 and 88 on the surface facing ring 52 which are spaced apart equal distances. The stops 78-88 are concentric and stops 78-82 on clamping ring 52 engage stops 84-88 on clamping ring 54 to limit the rotation of ring 54 with respect to the non-rotatable ring 52.

A lever 100 has arms 102 and 104 at right angles to one another and is pivoted to handle 62. Arm 102 of lever 100 extends along the inner surface of arm 63 of the handle. Arm 104 of the lever extends along the underside of arm 64 of the handle. At about the point where the arms 102 and 104 of lever 100 are joined, and where arms 63 and 64 of handle 62 are joined, the lever and handle are connected by a horizontal pivot pin 106. The actuator pad 66 on the free end of arm 64 of handle 62 has an opening 108 through which an upwardly bent end portion 110 of lever arm 104 projects.

The arm 102 of lever 100 is bent to follow the contour of handle arm 63 and terminates in an arcuate end portion 112 formed with a laterally extending lug 114. The end portion 112 curves over the clamping ring 54. Lug 114 projects across ring 52 and rests on the raised arcuate peripheral surface or track 116 on ring 52 or in the recess 117 behind track 116. A tension coil spring 118 whose ends are connected to lever arm 104 and handle arm 64 pulls them toward one another and presses lug 114 down upon the ring 52.

The handle 62 is used to manually turn the clamping ring 54 with respect to clamping ring 52. In FIG. 1, the handle is shown in solid lines in the clamped position and in dot-dash lines in the unclamped or release position. When in the unclamped position determined by engagement of stops 78,80 and 82 on clamping ring 52 with stops 84, 86 and 88 on clamping ring 54, the cams 68 and 69 on clamping ring 52 are at most only partially engaged with and at least partially circumferentially offset from cams 72 and 73 on clamping ring 54, so that the clamping ring 52 only lightly engages the side wall 42 of channel 22 and the steering column may be shifted up or down about pivot 16 to the desired position. At this time, the lug 114 rests on the arcuate track 116 of ring 52. When the clamping device is thus released, the steering column is urged upwardly about the pivot 16 by the torsion spring 30 and can be manually adjusted up or down.

When ring 54 is rotated by handle 62 in the opposite direction to the clamped position, the cams 72 and 73 climb cams 68 and 69 to a fully overlapped position pressing clamping ring 52 firmly against the side wall 42 of channel 22 with sufficient force to frictionally lock the pin 38 and steering column 10 against movement. During this time, the lug 114 rides along track 116 and is forced by spring 118 into the recess 117 behind the track to positively retain the handle and ring 54 in the clamped position. When it is desired to re-adjust the steering column, the lever is pivoted by pressing down on the end of the upwardly bent portion 110 which projects up through the opening in actuator pad 66 of the handle, to withdraw lug 114 from recess 117 and allow the handle 62 to be shifted to the dot-dash position of FIG. 1.

What is claimed is:

1. A locking device releasably locking a tilt steering column of an automotive vehicle in an adjusted position comprising a bracket adjacent to said column and fixed with respect to the automotive vehicle, a pin connected to a swinging portion of said column and movable along said bracket, a first clamping ring on said pin operably engaging said bracket and held against rotation relative to said bracket, a second clamping ring on said pin rotatable with respect to said first clamping ring, a handle for rotating said second ring in one direction to a clamping position and in the opposite direction to a release position, co-acting means on said first and second clamping rings operable in response to rotation of said second ring in said one direction to said clamping position to press said first clamping ring against said bracket with sufficient force to frictionally lock said steering column in the adjusted position, releasable means for retaining said handle in a position corresponding to the clamping position of said second ring, and means on said handle for releasing said releasable means.

2. A locking device as defined in claim 1, wherein said releasable means comprises a lug and a recess adapted to receive said lug.

3. A locking device as defined in claim 2, and further including a track leading to said recess along which said lug moves toward and away from said recess during rotation of said handle.

4. A locking device as defined in claim 3, and further including spring means urging said lug and recess relatively toward one another for engagement of said lug with said track and with said recess.

5. A locking device as defined in claim 2, wherein said lug is carried by said handle and said recess is formed in said first clamping ring.

6. A locking device as defined in claim 2 wherein said means on said handle for releasing said releasable means comprises a lever pivoted to said handle.

7. A locking device as defined in claim 6, wherein said lug is mounted on one end of said lever and said recess is formed in said first clamping ring, and further including a track on said first clamping ring along which said lug moves toward and away from said recess.

8. A locking device defined in claim 7, and further including spring means between said lever and said handle urging said lever to pivot in a direction causing engagement of said lug with said track and with said recess.

9. A locking device as defined in claim 8, wherein the free end of said handle has a hand actuator portion provided with an opening through which the opposite end of said lever projects and terminates in a convenient location for manual operation.

10. A locking device releasably locking a tilt steering column of an automotive vehicle in an adjusted position comprising locking members relatively movable between a column locking position and a column release position, a handle rotatable to a first position to relatively move said locking members to said locking position and to a second position relatively moving said locking members to said release position, releasable means for retaining said handle in said first position, and means on said handle for releasing said releasable means permitting movement of said handle to said second position.

11. A locking device as defined in claim 10, wherein said means on said handle for releasing said releasable means comprises a lever pivoted to said handle.

12. A locking device as defined in claim 11, wherein said releasable means comprises a lug and a recess adapted to receive said lug, said lug being mounted on one end of said lever.

13. A locking device as defined in claim 12, wherein the free end of said handle has a hand actuator portion provided with an opening through which the opposite end of said lever projects and terminates in a convenient location for manual operation.

14. A locking device as defined in claim 13, and further including spring means urging said lever to pivot in a direction causing engagement of said lug with said recess.

15. A locking device as defined in claim 14, and further including means providing a track along which said lug moves toward and away from said recess.

* * * * *